May 20, 1930.  W. J. ASCHENBACH  1,759,602
PUNCTUREPROOF PNEUMATIC INNER TUBE
Filed April 30, 1926
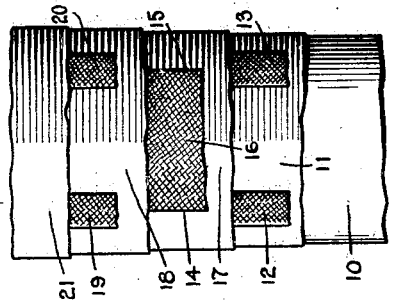
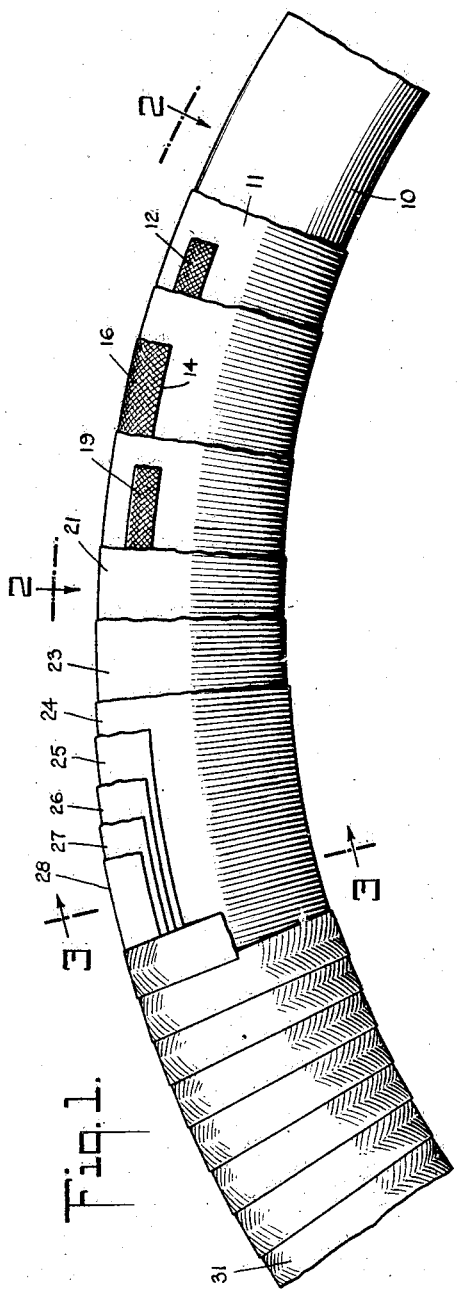
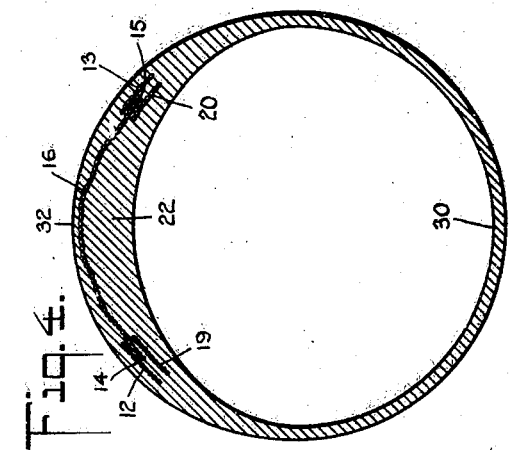
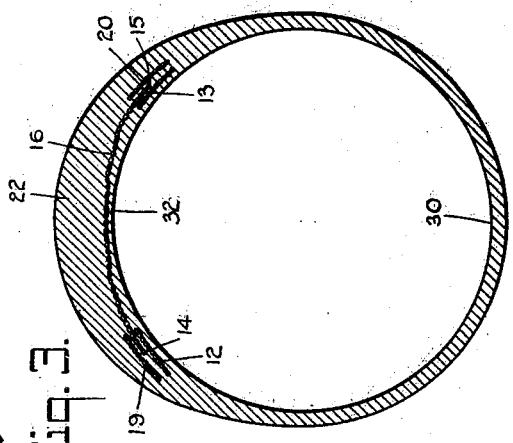
INVENTOR
Walter J. Aschenbach,
BY
Henry J. Lucke,
ATTORNEY.

Patented May 20, 1930

1,759,602

UNITED STATES PATENT OFFICE

WALTER J. ASCHENBACH, OF EAST ORANGE, NEW JERSEY

PUNCTUREPROOF PNEUMATIC INNER TUBE

Application filed April 30, 1926. Serial No. 105,626.

This invention relates to puncture-proof pneumatic inner tubes for automobile tires and the like.

My invention is particularly adapted to tire shoes in general use at the present time and is similarly adapted to other forms of tires for automobiles, motor-cycles, bicycles and the like.

My invention is an improvement over the form of inner tubes set forth in the U. S. Patent No. 956,884, John H. Brown, dated May 3rd, 1910, the U. S. Patent No. 1,121,467, John H. Brown, dated December 15th, 1914, the U. S. Patent No. 1,155,775, J. J. Voorhees, dated October 5th, 1915, and U. S. Patent No. 1,238,099, John H. Brown, dated August 28th, 1917.

Pursuant to pneumatic tires as set forth in the aforesaid patents, the length of the hollow composite body formed of laminæ of rubber and of canvas applied to the tread portion of the tube is cut of lengths for the respective sizes of tubes, and the ends are splined to form an overlapping joint. In such process, the initially made tubing is formed on a straight mandril and the canvas or other fabric is laid to have its warp extend longitudinally peripherally of the outer circumference of the tubing, the weft extending transversely, i. e., radially of the outer circumference. Such fabric, pursuant to the aforesaid patents, is designedly non-elastic and is of a material having a tensile strength approximating in commercial practice of one hundred pounds per square inch, whereby upon turning the tubing inside out, in the manner of turning a stocking out, the theretofore outer rubber portion is located inwardly of the tubing and by reason of the non-elasticity of the canvas the inward portion of the rubber is held under compression and rendered "self-healing" in the event that any nail or other article should pierce through the shoe or other tire and also pierce the inner tube through its tread portion. For such purposes, a special fabric, namely sea island canvas of unusually high tensile strength was deemed necessary for the purpose of attaining the characteristic of proof against puncture.

However, in the manufacture of such tubes having such non-elastic fabric, unsatisfactory results were obtained in the event that the precise length of the formed tubing or the extent of splining at the overlapping joint, or both, were departed from, thus giving rise to a tube which was either too long or too short than the inner circumference of the shoe in which it was placed and resulting in the breaking down of the fabric either immediately after installation or after a short period of use. Further difficulties were encountered by reason of the variation of the inner circumferential dimension of tire shoes, inevitable pursuant to the method of manufacture of the same, and also arising upon the inevitable elongation of the shoe after partial wearing and consequent breaking down of the same in use. Variations of the inner dimensions of tire shoes also arise, owing to the absence of standardization among manufacturers for purportedly the same sizes.

Pursuant to my invention, the fabric interposed between laminæ of rubber or other elastic material is cut on the bias relative to its warp and weft, whereby upon anchoring the lateral edges of the fabric with the immediately adjacent laminæ of rubber, the "self-healing" characteristic of the inner portion of the rubber laminæ on the interior of the tube is maintained notwithstanding variations in the length of the tubing or the extent of the overlap of the joint in the manufacture of the tube, and also notwithstanding any expansions of the shoe in the use of my improved inner tube. These advantages of my invention also obtain notwithstanding the variations of dimension, particularly for the inner faces, of the various makes of tire shoes.

Pursuant to my invention, supplemental layers of fabric, also preferably cut on the bias, are interposed between the aforesaid or main strip of fabric and the adjacent laminæ of rubber, thereby increasing the anchoring joint between the lateral edges of the main fabric strip and the immediately disposed laminæ of rubber. The use of supplemental or fillet strips cut on the bias not only increases the strength of the reinforce along its edges, but provides a reinforcing means which has a degree of elasticity in both transverse and longitudinal directions at least equal to the elasticity of the main strip of fabric. Consequently, the stretch throughout the tube is uniform along the margins of the main piece of fabric. The invention is, therefore, distinguishable from the prior practice, which involves the weakening of the main strip along its margins, as by scalloping its longitudinal or lateral edges.

I prefer to vulcanize the splined ends of the overlapping joint of the tubing in forming the inner tube, in lieu of securing the same together by cement or the like.

My invention is carried out with optimum results by forming the successive layers or laminæ of rubber and fabric on a circular, annular mandril, to thereby conform the areas of engagement and securement of the respective laminæ of rubber and fabric corresponding to the positions of the same when in use within a tire shoe or the like.

Further features and objects of the invention will be more fully understood from the following detail description and the accompanying drawings, in which Fig. 1 is a diagrammatic view illustrating an annular mandril on which are laid successive laminæ of rubber and fabric of such number as may be desired, pursuant to my invention, the successive laminæ being indicated in Fig. 1 in a direction from the right toward the left. The parts indicated at the extreme left-hand side of Fig. 1 show the finally formed laminæ of rubber and fabric preparatory for the vulcanizing stage;

Fig. 2 is a sectional elevation on line 2—2 of Fig. 1;

Fig. 3 is a sectional elevation on line 3—3 of Fig. 1, showing the laminæ of rubber and fabric in correspondence to the assembly of the same prior to vulcanizing, the mandril being omitted, and also showing such laminæ in position in correspondence to the inner tube after vulcanization; and Fig. 4 is a transverse sectional elevation of an inner tube embodying my invention; this view illustrates my composite inner tube under full inflation within a tire casing and under substantially no load.

Referring to Figs. 1 and 2, the order of assembly of the respective layers or laminæ of rubber is pursuant to that generally stated in the aforesaid Brown and Voorhees patents. In forming such layers of rubber, I prefer to use such rubber composition which when vulcanized yields "live" rubber. However, pursuant to my invention, the mandril 10 is annular and circular in cross-section. The annulus is slightly longer circumferentially than that of the resulting or desired inner tube, and the diameter of its transverse circumference is substantially that of the normal diameter of the desired or resulting inner tube. The first layer of rubber composition is indicated at 11; this layer extends for the complete length of the tubing, and exceeds that of the length of the desired inner tube by the extent of overlapping of the joint, as will appear more fully hereinafter.

Preferably, I provide a lower layer of spaced strips of fabric 12, 13, each strip 12, 13 extending circumferentially about a lateral periphery of the tubing 11, as indicated in Figs. 1 and 2. Such strips 12, 13 are substantially uniformly disposed relative to the central portion of the tubing 11, which subsequently becomes the circular apex of the tubing, and are disposed to extend in overlapping relation respectively relative to the oppositely disposed lateral edges 14, 15 of the main strip of fabric 16.

Such strips 12, 13 are hereinafter termed for brevity as supplemental fabric strips.

Upon such supplemental fabric strips 12, 13, I lay the layer or lamina 17 of rubber composition and upon the central portion of such rubber layer 17, I lay the main strip of fabric 16 to dispose its lateral edges 14, 15 respectively within the widths of the lower-fabric strips 12, 13. The length of the fabric 16 is cut on the bias, that is to say, its edges 14, 15 are cut at an angle to the warp and weft threads of the woven structure of the main fabric strip 16. As appears in the drawings, the lateral edges 14, 15 of the main fabric strip 16 are preferably cut straight; I also prefer to cut straight the lateral edges of the re-inforcing strips 12, 13, 19, 20.

Above such main strip 16 of fabric, I dispose the outward layer or lamina 18 of rubber and upon such outward layer 18, I dispose the oppositely disposed strips 19, 20 of fabric respectively outwardly of the previously disposed, inward fabric strips 12, 13 and similarly to overlap the opposite edges 14, 15 of the main fabric strip 16. Such strips 19, 20, of fabric are also preferably cut on the bias relative to their warp and weft threads.

Upon such outward strips 19, 20, I lay another layer 21 of rubber composition.

I prefer to employ canvas for such main strip 16, and the respective sets of fabric strips 12, 13 and 19, 20.

In building-up the aforesaid layers or laminæ of rubber composition and fabric, the same are applied to a flat bed or other suitable support. It is understood that such rubber composition comprises a suitable vulcanizing substance or medium such as antimony or the like. The built-up or superimposed laminæ or layers of rubber composition and fabric applied to the tubing 11 are then transferred from the flat support to an annular mandril, the circumferential length of which exceeds that of the desired or resulting inner tube by the extent of the overlapping splined joint.

The annular mandril is preferably formed of arcuate circular sections, connected by a hinged or other suitable joint serially with one another and disconnectible at one joint, to enable the resulting tubing after vulcanization to be readily stripped from the mandril.

The widths of the layers of rubber composition are such as to provide for a slight overlap at the inner circular periphery of the tubing applied to the annular, circular mandril, thus ensuring a seal by an autogenous joint upon enwrapping with the cloth 31, preparatory to the vulcanizing stage.

The tubing is preferably formed with a tread-like portion at its outer diametrical portion, as is indicated at 22, see Fig. 3, such tread portion being built up by the application of the successive layers 23, 24, 25, 26, 27, 28, of such number as may be desired.

The vulcanizing is usually carried out with the tubing of rubber composition and fabric enwrapped by the retaining cloth 31 and enclosing the annular mandril 10.

Upon completion of the vulcanizing, the cloth 31 is unwrapped and the tubing is stripped from the mandril 10. In stripping the tubing from the mandril, the release of the tubing from the mandril is facilitated by a directed blast of compresed air, acting in the manner of a wedge. The compressed air is directed from point to point to displace the tubing from engagement with the surface of the mandril and force manually or otherwise is applied to the progressively increased dis-engaged portion of the tubing until the tubing is freed from the mandril. This operation is expedited by the sectional assembly of the mandril.

The general arrangement of the parts of the stripped tubing is indicated in Fig. 3. It will be observed that the outward portion 22 of the vulcanized tubing is normally of an increased diameter and of a relatively large curvature as compared with its inward portion 32 i. e., originally complete tubing 11. In this status of the tubing, the main strip of fabric 16 is disposed more closely toward the inner peripheral portion 32 of the tubing than the outer peripheral portion 22.

The length of tubing is then turned inwardly upon itself, as in turning out a stocking, whereby the main length of fabric 16 is disposed more outwardly as appears by a comparison of the positions of the fabric 16 and the adjacent rubber sections as shown in Fig. 4 with their positions as shown in Fig. 3. The theretofore inwardly disposed portion 32 of the tubing 11, has now become the outwardly disposed portion, and conversely the theretofore outwardly disposed portion 22 of the tubing has now become the inwardly disposed portion. By reason of the range of the extensibility limited by the main strip 16 of fabric, the inwardly disposed portion 22 is held under compression, which compression is enhanced by the compression of the air within the interior of the resulting tube when in use, as will be apparent.

In the vulcanizing stage, the lateral edges 14, 15 of the main canvas or other fabric strip 16 are permanently secured to the immediately adjacent layers of laminæ of rubber, and likewise throughout the opposite faces of the fabric strip 16. To insure a permanent joint at the lateral straight edges 14, 15, the oppositely disposed sets of supplemental fabric strips 12, 13 and 19, 20 bridge the portions of the rubber laminæ which are respectively anchored to the lateral edges 14, 15, thereby re-enforcing such anchored portion of the laminæ of rubber and therewith the joint of the same with the lateral straight edges 14, 15 of the fabric strip 16; such function of the sets of supplemental fabric strips 12, 13, and 19, 20 is augmented by cutting the supplemental fabric strips on the bias and cutting straight the lateral edges of the supplemental fabric strips 12, 13, 19, 20.

From the above, it will appear that with the use of canvas or other fabric serving as the main retaining means for the inwardly disposed rubber of my inner tube, being cut on the bias, the fabric conforms itself to assume optimum positions relative to the immediately adjacent laminæ of rubber in the stage of building up the laminæ of rubber and fabric while supported on a flat bed and also in the stage of transferring the built-up laminæ from a position of flat support to a position on the circular annulus mandril. Such self-accommodation of the fabric also affords a wider range of self-adjustability of inner tubes without breakage or other damage to the fabric due to strains arising by reason of variations of the length of the tubing from which the inner tube is cut, variations in the extent of the overlap at the splined or other joint and in the variation of sizes of the various makes of shoes and variations ensuing upon the continued expansion of the tire shoe in use.

It will also be observed that inner tubes embodying my invention have a composite structure comprising one portion which serves as a complete inner tube, and further comprising another portion which serves as the compression element or portion; the bias cut fabric serves to join the contiguous faces of these composite portions of my inner tube and to maintain the compression element or portion at the desired degree of compression, whereby the inner tube portion under varying road conditions is maintained at substantially uniform tension, for any given load.

The parts of my invention illustrated in Fig. 4 conform generally to an inner tube for a cord type of tire shoe. For balloon sizes of tire shoes, and generally for use where the air pressure is desired to be decreased, the tread portion 32, see Fig. 4, may be increased in arcuate length, and the main fabric strip 16 correspondingly increased in its width, the sets of supplemental fabric strips 12, 13 and 19, 20 being correspondingly disposed relative to the lateral edges 14, 15 of the fabric strip 16. For such increased widths of the fabric 16, the bias strip 16 similarly attains highest results, by reason of its self-adjustment during the stages of manufacture to conform to the desired varied positions, thus imposing substantially equal strains upon the warp and weft threads of the main fabric strip 16 and also of the supplemental fabric strips 12, 13, 19, 20, and without engendering undue strain on any portion of the warp and weft threads and also in use, as ensues upon the turning of the wheel to bring successive portions of the shoe to relatively flattened position when in contact with the roadway and consequent relative flattening of the inner tube. By means of my invention, the fabric strip 16 may be of a length to extend arcuately substantially one-half of the circumference of the transverse periphery of the tube, thus providing for the puncture proof protection to substantially the full height of the side walls of the inner tube as well as over the tread portion of the inner tube.

It is my belief that the highly successful results which have been attained commercially by means of my invention, namely, the maintenance and integrity of the fabric strip 16 and the consequent self-healing status of the inner rubber portion of the inner tube is derived by distributing the strain to which the fabric strip 16 is subjected over the weft threads as well as the warp threads, by reason of the fabric strip 16 being cut on the bias, as compared with a non-bias cut fabric strip as heretofore proposed wherein the strain is borne substantially solely by the warp threads.

I claim:

A puncture proof pneumatic inner tube of resilient material having a relatively thickened outer peripheral tread and relatively thin side walls, a substantially continuous length of fabric disposed within said relatively thickened outer peripheral tread, the portion of said tread disposed inwardly of said length of fabric being under a relatively high compression, said length of fabric having its warp and weft threads extending on the bias to the direction of its length whereby both said warp and weft threads extend at an angle to the circumferential direction of the outer periphery of the thread and provide both transverse and longitudinal resiliency, the lateral edges of said fabric being substantially straight whereby the warp and weft threads individually terminate at substantially uniform distances from the longitudinal center of the fabric and afford a relatively high degree of edge strength under stretching strains, and supplemental strips of fabric disposed within said tread and overlapping the lateral edges of said first mentioned length of fabric, said supplemental strips also having their warp and weft threads extending on the bias and providing additional strength along the edges of the main strip with a degree of elasticity not less than the elasticity of the main strip whereby the stretch in the plane of the margins of the latter is substantially uniform throughout the tube.

In testimony whereof I have signed this specification this 28th day of April, 1926.

WALTER J. ASCHENBACH.